(12) United States Patent
Wright

(10) Patent No.: US 7,187,161 B2
(45) Date of Patent: Mar. 6, 2007

(54) TRANSIENT PROTECTION OF SENSORS

(75) Inventor: Wendell Lee Wright, Huntington, IN (US)

(73) Assignee: Wabash Magnetics, LLC, Wabash, IN (US)

( * ) Notice: Subject to any disclaimer, the term of this patent is extended or adjusted under 35 U.S.C. 154(b) by 0 days.

(21) Appl. No.: 10/617,641

(22) Filed: Jul. 11, 2003

(65) Prior Publication Data
US 2005/0007117 A1 Jan. 13, 2005

(51) Int. Cl.
*G01R 19/00* (2006.01)
*H02H 9/04* (2006.01)

(52) U.S. Cl. .................. 324/102; 361/111; 361/106
(58) Field of Classification Search .............. 324/324, 324/537, 102; 257/703; 361/103, 106, 111
See application file for complete search history.

(56) References Cited

U.S. PATENT DOCUMENTS

| | | | |
|---|---|---|---|
| 3,651,379 A * | 3/1972 | Moisand et al. | 361/106 |
| 3,794,950 A | 2/1974 | Kilner | |
| 3,804,995 A | 4/1974 | Beckr | |
| 3,882,711 A | 5/1975 | Crawford | |
| 4,068,281 A * | 1/1978 | Harnden, Jr. | 361/106 |
| 4,510,482 A * | 4/1985 | McClanahan et al. | 338/24 |
| 4,524,906 A | 6/1985 | Kenyon et al. | |
| 4,538,073 A | 8/1985 | Freige et al. | |
| 4,586,104 A | 4/1986 | Standler | |
| 5,043,559 A | 8/1991 | Scott | |
| 5,144,234 A | 9/1992 | Murata | |
| 5,206,596 A * | 4/1993 | Beihoff et al. | 324/536 |
| 5,276,697 A | 1/1994 | Davis | |
| 5,379,176 A | 1/1995 | Bacon et al. | |
| 5,495,383 A | 2/1996 | Yoshioka et al. | |
| 5,534,768 A | 7/1996 | Chavannes et al. | |
| 5,610,451 A | 3/1997 | Symonds | |
| 5,627,738 A | 5/1997 | Lubomirsky et al. | |
| 5,672,940 A * | 9/1997 | Wu | 315/8 |
| 5,910,775 A * | 6/1999 | Mears et al. | 340/815.4 |
| 6,201,680 B1 | 3/2001 | Tokatian | |
| 6,392,557 B1 | 5/2002 | Kreuter | |
| 2002/0080545 A1* | 6/2002 | Slater et al. | 361/106 |
| 2003/0086234 A1* | 5/2003 | Harford | 361/113 |
| 2003/0146502 A1* | 8/2003 | Parsons | 257/703 |
| 2004/0125528 A1* | 7/2004 | Nostrand | 361/118 |

FOREIGN PATENT DOCUMENTS

| | | |
|---|---|---|
| AU | 2002306033 A1 * | 11/2003 |
| EP | 0217985 A1 | 11/1989 |
| EP | 0217985 B1 | 11/1989 |
| EP | 736950 A1 * | 10/1996 |
| WO | WO 89/05086 | 6/1989 |
| WO | WO 02/16897 | 2/2002 |

* cited by examiner

*Primary Examiner*—Anjan Deb
(74) *Attorney, Agent, or Firm*—Krieg DeVault LLP

(57) ABSTRACT

The present invention includes a system with a sensor to detect a change in one or more physical characteristics and provide a corresponding electrical sensor signal, a controller including a power source for the sensor, and transient suppression circuitry. This circuitry is coupled between the sensor and the power source of the controller, and includes a first thermistor to protect the sensor from a power surge from the controller and/or power source.

36 Claims, 1 Drawing Sheet

TRANSIENT PROTECTION OF SENSORS

BACKGROUND

The present invention relates to transient protection of sensors, and more particularly, but not exclusively relates to the utilization of temperature sensitive devices to reduce adverse consequences of power surges for sensor assemblies.

It is frequently desirable to interface various sensors to controllers. In many instances, the controller interface provides electrical power to operate such sensors. Unfortunately, this arrangement sometimes generates transients that can damage sensors or other sensor circuit components connected to the controller. A similar problem can result when powering a sensor with a dedicated power supply or other source. Typically, general-purpose surge protectors are not adequate to provide the desired level of protection for many sensor configurations. Accordingly, there is a need for further contributions in this area of technology.

SUMMARY

One embodiment of the present invention is a unique technique for transient protection of a sensor. Other embodiments include unique systems, devices, apparatus, and methods for protecting sensing devices from transients.

A further embodiment includes a sensor operable to detect one or more physical characteristics and a transient suppression circuit coupled to the sensor. This circuit includes a thermistor operable to dissipate at least a portion of electrical power associated with a power surge.

In another embodiment, a sensing device includes a sensor operable to detect one or more physical characteristics and transient suppression circuitry coupled to the sensor. This circuitry includes a thermistor of the negative temperature coefficient type that is operable to couple with an electrical power source for the sensor. The transient suppression circuitry is responsive to a power surge condition from the source to dissipate electrical power associated with the surge through the thermistor. In a further form, another thermistor of the negative temperature coefficient type is included in the transient suppression circuitry. The electrical power source for the sensor can be provided by a controller that is responsive to the sensor signal. In a further variation of this form, the controller is of a Programmable Logic Controller (PLC) type.

Still another embodiment of the present invention includes providing electrical power to activate a sensing device, suppressing a transient power surge initiated by the provision of power with at least one thermistor, and detecting a change in one or more physical characteristics with the sensing device. In one form, the transient power surge has a duration of at least 250 microseconds and a peak of at least 500 milliamperes.

In yet another embodiment, a sensing device includes a sensor to detect a change in one or more physical characteristics and provide a corresponding electrical signal, a connector to couple the sensing device to other equipment including an electrical power source for the sensor, and transient suppression circuitry coupled to the sensor and the connector. This circuitry includes a thermistor electrically coupled to a node of the connector that is responsive to a power surge condition from the electrical power source to dissipate at least a portion of the electrical power associated with the surge.

Still a further embodiment of the present invention includes means for sensing one or more physical characteristics to provide a corresponding electrical sensing signal, means for activating and supplying electrical power to the sensing means, means for responding to a change in the sensing signal from the sensing means, and means for suppressing a power surge initiated by the activating means, which is coupled between the sensing means and the activating means. The suppressing means includes at least one thermistor.

Accordingly, one object of the present invention is to provide a unique technique for transient protection of a sensor.

Another object is to provide a unique system, method, device, or apparatus for protecting sensing devices from transients.

Other objects, embodiments, forms, features, advantages, aspects and benefits of the present invention shall become apparent from the detailed description and drawings included herein.

DETAILED DESCRIPTION

Figure 1:
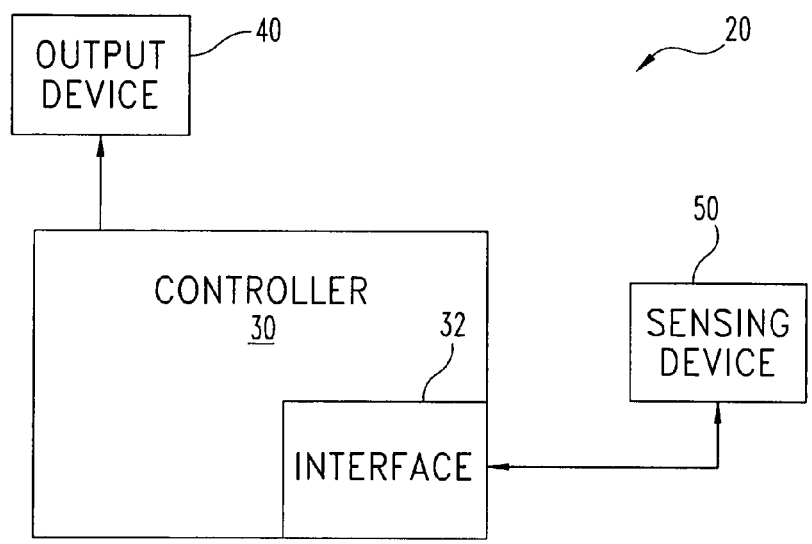
FIG. 1 is a schematic view of a system including a sensing device with transient suppression circuitry.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In one embodiment of the present invention, a sensing device is used to detect one or more physical characteristics. The sensing device is electrically coupled to a controller and a power source. The power source can be included in the controller. The connection of the sensing device to the controller is made through a corresponding interface. The controller is further connected electrically to an output device. The controller receives input from the sensing device and generates an output, which is sent to the output device. Transient suppression circuitry is utilized in the connection between the sensing device and the controller. The transient suppression circuitry utilizes thermistors to suppress power surges.

Other embodiments of the present invention are next described with reference to system 20 depicted in FIG. 1. System 20 includes controller 30, output device 40, and sensing device 50. Sensing device 50 is electrically coupled to sensing interface 32 of controller 30. Controller 30 is electrically coupled to output device 40.

Figure 2:
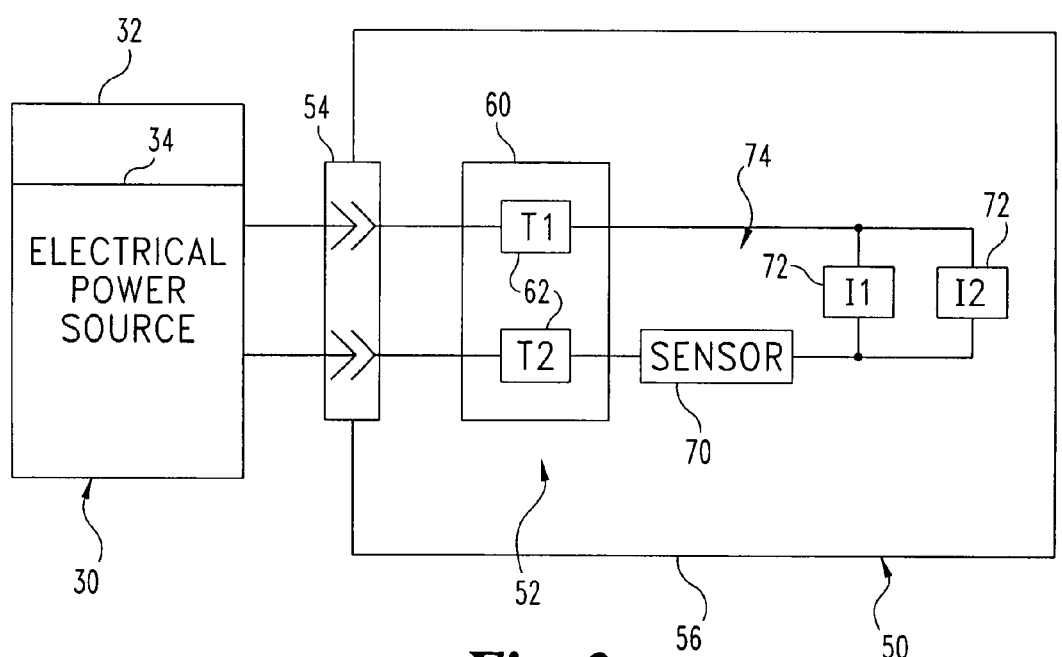
FIG. 2 is a schematic view of the sensing device of FIG. 1 shown in greater detail.

FIG. 2 depicts controller 30 and sensing device 50 of FIG. 1 in more detail. Sensing device 50 includes sensor assembly 52 coupled to connector 54. Sensing interface 32 includes electrical power source 34, which is operable to supply electrical power to sensing device 50. Interface 32 electrically couples to connector 54 of sensing device 50. Assembly 52 and connector 54 are provided as an integral sensing device unit 56. Sensor assembly 52 includes transient suppression circuitry 60, sensing circuitry 74, and indicators 72. Transient suppression circuitry 60 includes two negative temperature coefficient thermistors 62, that are more specifically designated thermistors T1 and T2. Indicators 72 of assembly 52 are more specifically designated indicators I1 and I2. Sensing circuitry 74 includes sensor 70. Sensor 70 is operable to detect one or more physical characteristics relative to its environment in a standard manner.

Sensor 70 is connected in series with thermistor T2 of transient suppression circuitry 60. Indicators 72 are electrically connected in parallel between sensor 70 and thermistor T1. Each individual thermistor 62 is connected to a different contact, and correspondingly a different electrical node, of connector 54. This connection topology results in two distinct electrical branches of circuitry 60, each having a different one of thermistors 62.

Generally referring to FIGS. 1 and 2, sensor 70 of circuitry 74 is operable to detect one or more physical characteristics when powered through connector 54 with power source 34. One example of a physical characteristic that can be detected with sensor 70 is the occurrence of a change in a magnetic field. Alternatively or additionally, sensor 70 can be operable to detect temperature, electrical conductivity, pressure, velocity, acceleration, pH, intensity of one or more wavelengths of electromagnetic radiation, acoustic vibration, and/or mass fluid flow, to name just a few nonlimiting examples. Signals representative of detected physical characteristics are output from sensor 70 to indicators 72, and through transient suppression circuitry 60 and connector 54 to controller 30. Indicators 72 respond to a desired change in the sensor signal to display appropriate data to a user of system 20. In one arrangement, one of indicators 72 is arranged to indicate that device 50 is properly connected to and powered by controller 30 via interface 32 and the other of indicators 72 indicates when sensor 70 detects a characteristic level that exceeds a desired threshold. In a further embodiment, one or more of indicators 72 is activated to indicate a failure condition. In other embodiments, indicators 72 can be differently arranged, including more or fewer indicators. In one alternative, indicators 72 are absent with sensor 70 being electrically coupled in series between thermistors T1 and T2.

Controller 30 receives signals from sensor 70, and selectively transmits an output signal to output device 40 in response thereto. In one nonlimiting example, controller 30 is a programmable logic controller and output device 40 is a power relay that is activated when a characteristic detected with sensor 70 exceeds a desired level. For this embodiment, device 50 operates as a discrete, two-state device. In other embodiments, device 50 can be configured to operate in more than two discrete states and/or in a continuous manner over one or more continuous ranges of values.

Source 34 (included in controller 30) supplies electrical power to sensing circuitry 74 via transient suppression circuitry 60. Both the detection signals from sensor 70 and electrical power are transferred along the same electrical pathways through transient suppression circuitry 60. Fluctuation in the power supplied to controller 30, a change in operating state of controller 30, connection or disconnection of unit 56 from interface 32, shifts in one or more environmental characteristics (such as temperature), device failures, and the like can cause transient increases in power output from source 34 to device 50 via interface 32 and connector 54. In one particular example, a transient results from initially powering device 50 through interface 32, which abruptly provides an electric potential to assembly 52.

Sensing circuitry 74 and sensor 70 may be susceptible to damage by such transient power surges. Transient suppression circuitry 60 is utilized to protect sensing circuitry 74 from power surges, including but not limited to, power surges that can result when cycling electrical power to system 20, including device 50 or some part thereof.

Transient suppression circuitry 60 utilizes thermistors 62 of a negative temperature coefficient type to suppress power surges. Prior to applying power to sensing device 50 from electrical power source 34, sensing device 50 and thermistors 62 are typically at or near ambient room temperature. When at or near room temperature, thermistors 62 are characterized by high electrical resistance. Thus, when power is applied to sensing device 50, the high electrical resistance of thermistors 62 dissipates power surges encountered by thermistors 62, thus protecting sensor 70. As energy flows through thermistors 62, the temperature of thermistors 62 increases. The increase in temperature of the thermistors 62 results in decreased electrical resistance. Thus, after sensing device 50 reaches a desired operating temperature, the electrical resistance in thermistors 62 decreases allowing signals from sensor 70 to be provided to controller 30 without undesired interference from transient suppression circuitry 60.

Although the operation of system 20 has been described utilizing negative coefficient thermistors, other thermistor types may be utilized in which electrical resistance is initially low at room/starting temperature to shunt power around the sensor device or devices to be protected from transients, and then electrical resistance is increased to allow sufficient current for operation of sensor 70 at a desired temperature. In still other embodiments, a combination of different thermistor types can be utilized.

In one preferred embodiment, transient suppression circuitry 60 is capable of suppressing power surges having a duration of at least 250 microseconds and a peak current of at least 500 milliamperes. In a more preferred embodiment, transient suppression circuitry 60 is capable of suppressing a power surge of up to 500 microseconds and a peak current of up to 1 ampere. Nonetheless, in other embodiments, a different power surge suppression capability is provided.

Transient suppression circuitry 60 can be utilized with different types of electrical power sources. For example, transient suppression circuitry 60 can be utilized with alternating current or direct current power sources. The utilization of two thermistors 62 in the manner illustrated provides for the suppression of power spikes originating from either electrical node of connector 54 before reaching sensor 70. In embodiments where it is desired to suppress spikes through only one of these nodes, only a respective one of thermistors 62 may be utilized.

In yet other embodiments, one or more of connector 54, circuitry 74, and/or indicators 72 is separate from one or more other portions of device 50 such that they are not collectively provided as an integral operating unit 56. Alternatively or additionally, power source 34 and/or interface 32 can be separate from controller 30 in further embodiments.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. An apparatus, comprising a sensing device including:
a sensor operable to detect one or more physical characteristics and provide a corresponding electrical sensor signal;
transient suppression circuitry coupled to the sensor, the transient suppression circuitry including a first negative temperature coefficient thermistor operable to couple with an electrical power source for the sensor, the transient suppression circuitry being responsive to a power surge condition from the source to dissipate electrical power associated with the surge through the first thermistor; and
a controller operable to provide the electrical power source, the controller being responsive to the sensor signal.

2. The apparatus of claim 1, further comprising an output device coupled to the controller, the controller being operable to provide an output signal to the output device in response to a change in the sensor signal.

3. The apparatus of claim 1, wherein the sensor assembly further comprises a second negative temperature coefficient thermistor, and the sensor is coupled between the first thermistor and the second thermistor.

4. The apparatus of claim 3, wherein the sensor is coupled in series with one or more indicators between the first thermistor and the second thermistor.

5. The apparatus of claim 4, wherein the first thermistor is coupled between one node of the power source and the sensor, the second thermistor is coupled between another node of the power source and the one or more indicators, and the controller is responsive to a change in the sensor signal to output a control signal to the output device.

6. The apparatus of claim 1, wherein the sensor and the transient suppression circuitry are incorporated into an integral sensing device unit.

7. An apparatus, comprising a sensing device including:
a sensor operable to detect one or more physical characteristics and provide a corresponding electrical sensor signal; and
transient suppression circuitry coupled to the sensor, the transient suppression circuitry including a first negative temperature coefficient thermistor operable to couple with an electrical power source for the sensor, the transient suppression circuitry being responsive to a power surge condition from the source to dissipate electrical power associated with the surge through the first thermistor, wherein the transient suppression circuitry includes a second negative temperature coefficient thermistor.

8. The apparatus of claim 7, wherein the one or more physical characteristics include a change in a magnectic field detectable with the sensor.

9. The apparatus of claim 7, further comprising a controller operable to provide the electrical power source, the controller being responsive to the sensor signal.

10. An apparatus, comprising a sensing device including:
a sensor operable to detect one or more physical characteristics and provide a corresponding electrical sensor signal; and
transient suppression circuitry coupled to the sensor, the transient suppression circuitry including a first negative temperature coefficient thermistor operable to couple with an electrical power source for the sensor, the transient suppression circuitry being responsive to a power surge condition from the source to dissipate electrical power associated with the surge through the first thermistor, wherein the one or more physical characteristics include a change in a magnetic field detectable with the sensor.

11. A method, comprising:
providing electrical power to activate a sensing device;
suppressing a transient power surge initiated by said providing, the transient power surge having a duration of at least 250 microseconds and a peak current of at least 500 milliamperes;
detecting a change in one or more physical characteristics with the sensing device; and
wherein said suppressing includes dissipating at least a portion of the transient power surge with a first negative temperature coefficient thermistor and the change in the one or more physical characteristics includes an alteration in a magnetic field.

12. The method of claim 11, wherein the duration of the transient power surge is between 250 and 500 microseconds and the peak current is between 0.5 and one ampere.

13. The method of claim 11, further comprising a second negative temperature coefficient thermistor.

14. The method of claim 11, which includes:
coupling the sensing device to a controller; and
supplying the electrical power from the controller.

15. The method of claim 11, which includes:
coupling the sensing device and an output device to a controller; and
providing an output signal to the output device from the controller in response to said detecting.

16. The method of claim 11, wherein the sensing device includes a sensor and an indicator electrically coupled together.

17. The method of claim 16, further comprising coupling the first thermistor to one of the sensor and the indicator.

18. The method of claim 11, further comprising packaging the sensing device and the first negative temperature coefficient thermistor within an integral sensing device unit.

19. A sensing device, including:
a sensor to detect a change in one or more physical characteristics and provide a corresponding electrical signal;
a connector to couple the sensing device to other equipment including an electrical power source for the sensor; and
transient suppression circuitry coupled to the sensor and the connector, the transient suppression circuitry including a first thermistor electrically coupled to a first node of the connector and a second thermistor coupled to a second node of the connector, the transient suppression circuitry being responsive to a power surge condition from the electrical power source to dissipate at least a portion of electrical power associated with the surge.

20. The device of claim 19, wherein the change in the one or more physical characteristics corresponds to alteration of a magnetic field detectable with the sensor.

21. The device of claim 19 wherein the first thermistor is of a negative temperature coefficient type.

22. The device of claim 21, wherein the first thermistor and the second thermistor anre each of a negative temperature coefficient type.

23. The device of claim 22, further comprising one or more indicators electrically coupled to the sensor.

24. The device of claim 23, wherein the sensor and the one or more indicators are electrically coupled in series between the first thermistor and the second thermistor.

25. The device of claim 19, wherein the sensor and the transient suppression circuitry are incorporated into an integral sensing device unit.

26. The device of claim 25, wherein the connector is incorporated into the integral sensing device unit.

27. A system, comprising:
- a sensor to detect a change in one or more physical characteristics and provide a corresponding electrical sensor signal;
- a controller including a power source for the sensor; and
- transient suppression circuitry coupled between the sensor and the power source of the controller, the transient suppression circuitry including a first thermistor to protect the sensor from a power surge by dissipating at least a portion thereof.

28. The system of claim 27, wherein the first thermistor is of a negative temperature coefficient type and the transient suppression circuitry further includes a second thermistor of the negative temperature coefficient type.

29. The system of claim 27, further comprising means for indicating coupled to the sensor.

30. The system of claim 27, further comprising an output device coupled to the controller, the controller being operable to respond to a change in the sensor signal to provide an output signal to the output device.

31. The system of claim 27, wherein the sensor and the transient suppression circuitry are packaged in an integral unit for connection to the controller.

32. The system of claim 27, further comprising one or more indicators electrically coupled to the sensor and wherein the transient suppression circuitry includes a second thermistor, the sensor and the one or more indicators being coupled between the first thermistor and the second thermistor.

33. The system of claim 27, wherein the one or more physical characteristics include alteration of a magnetic field detectable with the sensor.

34. A sensor system, comprising:
- a sensor operable to detect one or more physical characteristics and provide a corresponding electrical sensor signal; and
- a controller including a power source for the sensor; and
- transient suppression circuitry coupled between the sensor and the power source of the controller and including a first thermistor to protect the sensor from a power surge by dissipating at least a portion thereof; and
- wherein the sensor and the transient suppression circuitry are incorporated into an integral sensing device unit located remote from the controller.

35. The system of claim 34, wherein the first thermistor is of a negative temperature coefficient type; and
- wherein the transient suppression circuitry further includes a second thermistor of a different temperature coefficient type.

36. The system of claim 35, wherein the second thermistor is of a negative temperature coefficient type.

* * * * *

UNITED STATES PATENT AND TRADEMARK OFFICE
CERTIFICATE OF CORRECTION

| | | |
|---|---|---|
| PATENT NO. | : 7,187,161 B2 | Page 1 of 1 |
| APPLICATION NO. | : 10/617641 | |
| DATED | : March 6, 2007 | |
| INVENTOR(S) | : Wendell Lee Wright | |

It is certified that error appears in the above-identified patent and that said Letters Patent is hereby corrected as shown below:

Col. 6, Line 62: Replace "anre" with --and--.

Signed and Sealed this

Twenty-sixth Day of June, 2007

JON W. DUDAS
*Director of the United States Patent and Trademark Office*